US010779207B2

(12) United States Patent
Mrozinski (10) Patent No.: US 10,779,207 B2
(45) Date of Patent: *Sep. 15, 2020

(54) SINTER AND INTRASEARCH BEACON

(71) Applicant: Parallel Wireless, Inc., Nashua, NH (US)

(72) Inventor: Eric Mrozinski, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,311

(22) Filed: May 7, 2019

(65) Prior Publication Data

US 2019/0289511 A1    Sep. 19, 2019

Related U.S. Application Data

(63) Continuation of application No. 15/932,241, filed on Feb. 16, 2018, now Pat. No. 10,285,097.

(60) Provisional application No. 62/459,639, filed on Feb. 16, 2017.

(51) Int. Cl.
| | | |
|---|---|---|
| *H04W 36/04* | (2009.01) | |
| *H04W 36/00* | (2009.01) | |
| *H04W 36/36* | (2009.01) | |
| *H04W 48/16* | (2009.01) | |
| *H04W 48/20* | (2009.01) | |

(52) U.S. Cl.
CPC ... *H04W 36/0083* (2013.01); *H04W 36/0072* (2013.01); *H04W 36/04* (2013.01); *H04W 36/36* (2013.01); *H04W 48/16* (2013.01); *H04W 48/20* (2013.01)

(58) Field of Classification Search
CPC ......... H04W 36/0072; H04W 36/0083; H04W 36/04; H04W 36/36; H04W 48/20; H04W 48/16; H04W 36/0016; H04W 36/20; H04W 68/00; H04W 84/045; H04W 88/02; H04W 8/183
USPC ....... 455/436–437, 550.1; 370/235, 252, 311
See application file for complete search history.

(56) References Cited

U.S. PATENT DOCUMENTS

| | | | |
|---|---|---|---|
| 2010/0203892 A1* | 8/2010 | Nagaraja | H04W 36/30 455/437 |
| 2010/0210255 A1* | 8/2010 | Amirijoo | H04W 74/002 455/419 |
| 2011/0044243 A1 | 2/2011 | Yi et al. | |
| 2012/0135739 A1* | 5/2012 | Paterson | C07K 14/195 455/436 |
| 2013/0072195 A1* | 3/2013 | Molander | H04W 48/18 455/437 |

(Continued)

*Primary Examiner* — Nathan S Taylor
(74) *Attorney, Agent, or Firm* — Michael Y. Saji; David W. Rouille (57) ABSTRACT

A method for cell reselection control is disclosed, comprising: sending an instruction from a radio network to a user equipment (UE) in an idle mode to adjust an existing cell reselection parameter at a UE to a high value; subsequently instructing the UE to return the cell reselection parameter to its previous value, after a first predetermined interval; and subsequently sending a second instruction to the UE in an idle mode to adjust the cell reselection parameter at the UE to the high value, after a second predetermined periodic interval, causing the UE to reselect to a cell with superior signal even when the UE may be under good coverage attached to an existing macro cell, thereby offloading the macro cell.

12 Claims, 7 Drawing Sheets

(56) References Cited

U.S. PATENT DOCUMENTS

| | | |
|---|---|---|
| 2013/0182655 A1 | 7/2013 | Das et al. |
| 2013/0188499 A1* | 7/2013 | Mach ............... H04W 48/20 370/252 |
| 2015/0065135 A1 | 3/2015 | Claussen et al. |
| 2015/0282010 A1* | 10/2015 | Yang ............ H04W 36/0016 455/437 |
| 2016/0073312 A1* | 3/2016 | Sridhar ............ H04W 48/16 370/235 |
| 2016/0323787 A1 | 11/2016 | Nanri et al. |
| 2016/0323788 A1 | 11/2016 | Nanri et al. |
| 2018/0027460 A1* | 1/2018 | Zhang ............ H04W 36/0083 455/437 |

* cited by examiner

SINTER AND INTRASEARCH BEACON

CROSS-REFERENCE TO RELATED APPLICATIONS

This application is a continuation of, and claims the benefit of priority under 35 U.S.C. § 120 of U.S. patent application Ser. No. 15/932,241, titled "Sinter and Intrasearch Beacon", and filed Feb. 16, 2018, which itself claims the benefit under 35 U.S.C. § 119(e) of U.S. Provisional Patent Application No. 62/459,639, titled "Sinter and Intrasearch Beacon" and filed Feb. 16, 2017, both of which are hereby incorporated by reference herein in their entirety. This application also hereby incorporates by reference in their entirety for all purposes U.S. Pat. Pub. No. US20140133456, titled "Dynamic Multi-Access Wireless Network Virtualization" and published May 15, 2014, and U.S. Pat. Pub. No. US20150257051, titled "Federated X2 Gateway" and published Sep. 10, 2015. Additionally, the following documents are hereby incorporated by reference in their entirety for all purposes: U.S. patent application Ser. No. 15/721,728, titled "Handovers with Simplified Network Topology" and U.S. patent application Ser. No. 15/782,819, titled "X2 Brokering Between Inter-3GPP Release eNodeB's" and U.S. Pat. Pub. No. US20170273134A1, titled "IuGW Architecture" and U.S. Pat. Pub. No. US20160044531A1, titled "Congestion and Overload Reduction". Additionally, 3GPP TS 25.331 10.3.2.3, 3GPP TS 25.304, 5.2.6.1.1 Measurement rules for cell re-selection when HCS is not used, 3GPP TS 25.304, 5.2.6.1.2 Measurement rules for cell re-selection when HCS is used, 3GPP TS 25.304, (E-UTRA); User Equipment (UE) procedures in idle mode, 5.2.4.2 Measurement rules for cell re-selection are incorporated by reference in their entirety for all purposes, dated as of the priority date of the present application.

BACKGROUND

UMTS Femtocells are deployed either on their own 5 MHz frequency sub-band (Downlink-frequency—"UARFCN"), or on a frequency sub-band which they share with UMTS macro-cells (macro base stations). The UARFCN used by femtocells is hereafter referred to as "UARFCN femto." In most cases, an operator deploying femtocells owns a second (or even third) 5 MHz frequency sub-band that is reserved for exclusive use by macro-cells, which is referred to as "UARFCN macro".

The operator's objective is to assure that their customers' handsets ("UEs") re-select from a (large-coverage) marcocell to a close-by femtocell whenever it makes sense, that is, when the UE has evaluated and confirmed that femtocell is suitable from RF point of view, and that the cell reselection criteria are met. The evaluation is done autonomously by the handset (i.e. without explicit commands from the network) during idle-mode operation. It requires that the UE performs measurements on both the currently serving cell/frequency, as well as on the target-cell/target-UARFCN.

SUMMARY

In a first embodiment, a method is disclosed, comprising: sending an instruction from a radio network to a user equipment (UE) in an idle mode to adjust an existing cell reselection parameter at a UE to a high value; subsequently instructing the UE to return the cell reselection parameter to its previous value, after a first predetermined interval; and subsequently sending a second instruction to the UE in an idle mode to adjust the cell reselection parameter at the UE to the high value, after a second predetermined periodic interval, causing the UE to reselect to a cell with superior signal even when the UE may be under good coverage attached to an existing macro cell, thereby offloading the macro cell.

The cell reselection parameter may be an Sintersearch threshold. The cell reselection parameter may be an Sintrasearch threshold. The high value may be a maximum permitted value. The method may further comprise repeatedly raising the cell reselection parameter to a high value, in order to cause the UE to perform a neighboring cell search from idle mode and identify another cell to which to attach. The first predetermined interval and the second predetermined periodic interval may be configured to cause the UE to perform a periodic neighboring cell search while having a 5% impact on projected UE battery life. The first predetermined interval may be 5 seconds and the second predetermined periodic interval may be every 5 minutes.

The previous value may be a cell reselection parameter value configured based on an assumption that significantly overlapping cell coverage may be rare. The cell with superior signal may be a small cell configured to cover a small area that may be a subset of the coverage area of the existing macro cell. The radio network may be a nodeB, an eNodeB, a radio network controller, a 3G core network, or a 4G core network. The radio network may be a nodeB or eNodeB, and the radio network may be configured with the first predetermined interval and the second predetermined periodic interval by a coordinator node in an operator core network. The cell reselection parameter may be a SsearchRAT threshold. The cell reselection parameter may be an SrxlevServing parameter in a Long Term Evolution (LTE) radio access technology.

DETAILED DESCRIPTION

A concept is disclosed which allows UEs to reselect effectively from a large cell—serving as umbrella—to a smaller cell (micro, pico, femto), and while limiting the amount of neighbor cell measurements and keeping UE's battery usage low. To save battery, the UE only starts measuring neighbor cells when the serving cell's quality falls below a set of "Search"-thresholds. This mechanism is defined by 3GPP (for 3G, and similar for 4G). The thresholds are used in a static way: they are unchanged during the cell's operation, or only changed occasionally, in the context of the radio network optimization. If a UE is in the small cell's range, it may not reselect to it as early as the operator may wish. Even more so, if the small cell uses different frequency than the umbrella cell, the UE may not reselect at all. In any case, inter-frequency reselection is not deterministic, and intra-frequency reselection not optimal or occurring late. The solution is a "Sinter- and intrasearch-Beacon", which consists in modifying the Search-thresholds dynamically, with a periodically, short-term applied high level. This incites the UE to look for suitable neighbor cells, but only during a short time, thereby keeping battery consumption low.

The subject is the management of cell re-selection by the UE, from a UTRAN macro-cell to a UTRAN micro-, pico- or femto-cell, or from on femtocell to another femtocell, and even from a macro-cell to another macro-cell. The proposed solution offers a method that overcomes one important "hurdle" (restrictive condition) that can prevent the UE from reselecting between cells where it would be desirable to facilitate reselection: e.g. for load balancing, or generally for making use of small cells. At the same time, it is necessary to ensure the advantage for which the "hurdle" is used, is not lost: UE battery savings. The need for facilitating reselection is especially high for cases of mobility from a macro-cell to a femtocell (e.g. when entering a home of office), but it also exists for the other cases hinted at, above. There are a few patents and ideas on this subject, but those have inherent disadvantages. These are e.g. costs, power consumption of the femtocell access point (FAP), disruption on the frequency spectrum (RF-jamming/interference). The here-proposed solution has none of those disadvantages and is achieved solely by implementation in software with low effort. The solution makes use of functionality and data already specified by the 3GPP standard and used by today's commercially available handsets. The concept (S-inter-/intra-search beacon) can be implemented in UTRAN macro-cells (i.e. in a macro-Radio Network Controller—RNC) as well as in femtocells. Note: Femtocells combine the RNC with the Base station functionality, on a single chip.

Two types of reselections within the UMTS/UTRAN system exist: (1) inter-frequency reselection (the current cell is on one UARFCN, while the potential target-cell is on another; and (2) intra-frequency reselection (both the current cell and the potential target-cell operate on the same frequency)

For intra-frequency reselection, the UE must have detected and measured the quality of the potential target cells that are located in its proximity. However, it will only start this search & measure process if the cell that it is camping on reaches a quality/signal strength below a specific threshold. It is only when the serving cell's quality falls below the threshold that the UE starts searching for cells on the same frequency that it currently camps on. This threshold is specified by the 3GPP standard as "Sintrasearch", a value broadcasted by the cell to all UEs, via a common channel.

Analogous applies for inter-frequency reselection, where the corresponding threshold is called "Sintersearch".

If the serving macro-cell's strength or quality is above the threshold, the UE will not perform measurements and therefore not be in a position to reselect to the femtocell.

In some embodiments, inter-frequency reselection is an interesting case in that small cell overlay/underlay deployments are often provisioned on different frequencies. By provisioning, for example, a macro cell base station with one frequency (perhaps one that propagates very well) and a small cell base station with another frequency (perhaps one that enables a higher modulation or data rate, or one that is complementary to the first frequency), the operator can provide coverage without the two cells interfering with each other in a frequency-division duplexed (FDD) deployment. Interference between these two cells actually can enable a UE to observe reduced signal quality from a macro cell, and thereby initiate handover or reselection, which can occur when the macro cell and small cell are deployed on the same frequency. However, in the case that the macro cell and small cell are deployed on different frequencies, a UE may not experience deteriorating signal quality from either cell and may need to be prompted to perform a search to identify higher-quality cells and to initiate handover or reselection.

For simplicity, the following covers only the case of an inter-frequency reselection, but the principle for intra-frequency reselection is similar.

Let's take the case where the macro-cell serving the UE is on UARFCN macro, and there is a femtocell in the UE's proximity, which operates on UARFCN femto, and which not only offers a higher data rate than the serving macro-cell, but also service at lower tariff or cost, in some cases. It is in the user's interest to benefit from this advantage, and it is also in the operator's interest to offload the traffic from the macro-cell, towards the femtocell. Macro offload is beneficial for a number of reasons. For example, it enables the macro to be useful for the wide variety of users that are not covered by femtocells, such as for users that are moving at high speed in a moving vehicle. This method therefore enables the macro and the femtocell to best utilize their respective special functions and abilities.

The typical situation is that the "umbrella"-macro-cell, which covers a large area, is still in such good enough "shape" quality-/signal-strength-wise, that the above-mentioned threshold is not reached, and hence the UE does not initiate a search for the femtocell on UARFCN femto. Reselection to the femtocell therefore mostly doesn't happen.

The same problem/principle applies to the case where the UE is camping on a femtocell, but at a remote location (large distance/path loss from that femtocell), where it would be appropriate if the UE re-selected to another, closer (neighbor) femtocell. In this case, the UE has a bigger path-loss to the serving femtocell than to the neighboring femtocell, which requires a substantial amount of transmit power when a radio link is established to the serving cell (also during the ongoing radio link). This generates high interference at the neighbor femtocell receiver. Facilitating the re-selection to the neighboring femto-cell would avoid this problem and also lead overall to a better distribution of UEs among femtocells.

For simplicity, the case of re-selection from a macro-cell to a femtocell is described in the following chapters, but the proposed idea applies to re-selection from femtocells to femtocells as well.

Several ways to solve the problem described herein are proposed today, but all have their significant disadvantages. These are:

One idea is to change the threshold "Sintersearch" such that this UE search & measure process is triggered earlier, i.e. while the serving macro-cell is still in (very) good shape. The significant drawback is that this obliges the UE to frequent/continuous measurements during idle operation, and so the UE will consume much more power than is normally the case (i.e. with the current "normal" value of Sintersearch). The whole purpose of Sintersearch would be void—the UE's idle ("standby") time would be significantly reduced.

Another idea is to equip the femtocell with a RF jammer, which would transmit noise on UARFCN macro, and cause sufficient interference in its proximity that the surrounding macro-cell's signal quality deteriorates. The threshold would be reached and the UE would start the search & measure process.

The drawback to certain prior art solutions is that the macro-cell's frequency is jammed (subject to interference), which causes a significant degradation of the macro-cell quality (i.e. downlink data transfer capacity) in the femtocell's coverage range. In the worst case the macro-cell is not usable in that area. The other drawback is that the area around the femtocell access point where the UE would be motivated to search for the femtocell is difficult to control/determine, and one would have to arbitrate between maximizing this "re-selection range" (i.e. makie it identical with the femtocell's foreseen coverage), with large-scale negative effects on the macrocell, and keeping this "re-selection range" small, which isn't user-friendly, because the user would have to approach the femtocell base station close enough for the UE to lock on it.

Another drawback to the prior art is the need for an additional transmitter (RF, filters and amplifer), which implies additional hardware costs.

Proposed Solution

The basic principle discussed herein is to dynamically toggle a cell selection/reselection threshold, e.g., the Sintersearch threshold, between the normal value and a max-value that forces the UE to execute the search & measurement process. This "on-off" switching is similar to a pulse-width modulation, and is called "Sintersearch beacon," in allusion to a light beacon in navigation.

The idea is to keep the duty cycle (the relative "on-time") short enough such that the battery consumption in UE idle mode is not significantly increased, because in this case, the UE takes into account the "normal" qualification threshold most of the time, and only during a short time does the UE perform 'unconditional' search & measuring of cells (i.e. also femtocells) on UARFCN femto. While the duration of the normal behavior is in the order of minutes, the latter's duration is in the order of seconds. In some embodiments, the cell reselection parameter may be transmitted to all UEs associated with the base station in the system information block (SIB) of the base station control channel.

This feature of "Sintersearch beacon" (toggling of System Information parameter "Sintersearch") would have to be implemented by the macro-NW vendor (or FAP SW supplier), in their Radio Network Controllers (RNCs), and based on an input from their Operation & Maintenance Center (OMC). Latter would communicate the duty cycle/"on-off"-ratio to the RNC, and the RNC would schedule the toggling of Sintersearch appropriately.

Interestingly, Qualcomm has mentioned such principle in its publications, but which is realized through another method. That method would require that all UEs of the world are upgraded to some new standardized feature. Qualcomm has stated: "One solution which can guarantee femto discovery without causing excessive cell search is the UE enhancement, for which the UE performs periodic interfrequency searches every few minutes (e.g., every two to five minutes) irrespective of serving cell quality. This method achieves very good femto discovery performance without a need to increase the macro Sintersearch setting. Once the UE finds a femto on the other frequency and its CPICH Ec/Io is higher than −12 dB (cf. Table 1), the UE will attempt to reselect to the femto. As shown in FIG. 10, the femto discovery performance of the HUE is greatly improved with the proposed slow background search (SBS). Here the period of the background search is 300 sec. A major drawback of this method, however, is that it only applies to future UEs and does not solve the femtocell discovery issue for legacy UEs. To solve the femto discovery issue of legacy UEs, we propose a cell reselection beacon as described in the next section." This is not feasible, as they admit. In the context of this idea, Qualcomm suggests/indicates that a 5-minutes time separation between inter-frequency measurements would lead to great "FAP discovery performance" without the need to increase Sintersearch.

The here-proposed solution requires in contrast a change in the UTRAN network which is transparent to the mobiles, and effectively allows for exactly what Qualcomm would like to see in terms of UE behavior ("slow background search"), and with today's UEs.

The proposed solution has the following advantages: only a small amount of increase in average idle power consumption (1-2%); no jamming of macro-cells; no degradation of downlink macro-cell capacity; and no need for additional hardware (i.e. jammer-transmitter).

Different values of the thresholds are contemplated. In some embodiments, if a threshold has a maximum value, the beaconing method described herein may instruct the UE to set the threshold to its maximum value, and then to return the threshold to another lower value suitable for ordinary use. In some embodiments, a dormancy period, for example, 5 minutes, may be followed by an activation period of an elevated threshold. The percentage of time used for the activation period can be thought of as a duty cycle. In some embodiments, the dormancy period plus the activation period may constitute a periodicity of the system. In some embodiments, configuration may be effected by passing the periodicity of the system, plus in some embodiments the desired max and dormant (ordinary time) threshold values, to the cell. In some embodiments, a maximum delay for reselection may be defined using a hysteresis parameter or another parameter.

The proposed solution has certain characteristics that constitute additional work items: the RNC software needs to be extended by this feature (work on NW vendor side); the network operation & maintenance center (OMC) needs to incorporate this notion of a duty cycle for the "Sintersearch-PWM"; and because an operator's UMTS/UTRAN network can consist of equipment from various vendors, this feature would best have to be standardized.

Following figure describes the operation of the S-inter-/intra-search beacon. The solution's trade-off is delay before measurement and reselection, and battery consumption. Shorter delay costs more frequent measurement and therefore more battery.

Applicability to 3G—other types of reselection could also apply, as follows: inter-RAT: SsearchRAT; Context of Hierarchical Cell Structure (HCS): Sintrasearch, Sintersearch, SsearchRAT. This is also applicable also to 4G/LTE: SrxlevServing<sIntraSearch (SIB 3); and SrxlevServing<sNonIntraSearch (SIB 3).

3GPP TS 25.133, 4.2.2.1 Measurement and evaluation of cell selection criteria S of serving cell, states: the UE shall measure the CPICH Ec/Io and CPICH RSCP level of the serving cell and evaluate the cell selection criterion S defined in [1] for the serving cell at least every DRX cycle.

3GPP TS 25.133, 4.2.2.3 Measurements of inter-frequency FDD cells states: If priority information for UTRA FDD carrier frequencies is provided in the measurement control systems information and the S-value of the UTRA serving cell is greater than Threshserving high then the UE shall search for any higher or equal priority UTRA inter-frequency cells at least every Thigher_priority_search where Thigher_priority_search is described in section 4.2.2. If higher priority UTRA cells are found by the higher priority search, they shall be measured at least every (Ncarrier−1) *TmeasureFDD, . . . . The parameter Ncarrier is the number of carriers used for FDD cells.

The same principle can be applied for Sintrasearch, that is, for reselection to an inTRA-frequency Femtocell. The principle can be applied to both measurement quantities for cell reselection (i.e. CPICH-EcNo and CPICH-RSCP).

The on-time in the duty cycle must consider any time required to qualify/trigger reselection (e.g. TevaluateFDD, Treselection timer . . . ), as well as measurement periods (Ncarrier, TmeasureFDD, both a function of DRX cycle length). In some embodiments, values are in the range of 0.6 to 10 seconds. In some embodiments, various offsets and hysteresis values may be contemplated in addition to or in conjunction with the base thresholds described herein, as known in the art in each of the relevant standards. For example, hysteresis parameters may be used to reduce reselection based on spurious or transient readings, and offset parameters may be used to reduce ping-ponging (immediate reselection or handover to a prior cell). As a specific example, according to the UMTS standard, Qrxlevminoffset is subtracted from Qrxlevmin to calculate a minimum RSRP requirement for cell selection. Qrxlevmin may be used as the cell (re-)selection parameter, and the ordinary operation of Qrxlevminoffset would be preserved.

In some embodiments, the present method could be applied to other UE states, such as cell PCH state as well as IDLE state, or 4G LTE IDLE state. Cell PCH mode is used when the UE is available for paging. The cell reselection parameter may be a SsearchRAT threshold. The cell reselection parameter may be an SrxlevServing parameter in a Long Term Evolution (LTE) radio access technology. Different cell reselection parameters may be used for different RATs, such that the valid reselection parameter that is used while the mobile device is idle is used for each RAT as appropriate.

Subsequent to receiving the instruction to increase the cell reselection threshold, if the UE identifies a better cell to connect to, the UE typically will not perform any signaling, since the UE is still in the IDLE state. No feedback or signaling is sent from the UE to the broadcasting cell. When the UE subsequently activates or connects, it will attach to the newly-identified cell.

Additional Power Consumption of Macro-Cell UEs with Sintersearch-Beacon

At usual/normal level of Sintersearch (e.g. 5), assume the following: 10% of the macro-cell's UEs do constantly inter-frequency measurements, with each of those UEs consuming <P,idle,with-inter-search>; 90% of the UEs don't do inter-frequency measurements and consume <P,idle,no-inter-search>; and a 2% duty cycle on Sintersearch Beacon.

It follows that the overall average power consumption of each UE is P,overall,no-Sintersearch-Beacon=10%*<P,idle,with-inter-search>+90%*<P,idle,no-inter-search>.

With the proposed Sintersearch-Beacon, 100% of the UEs do inter-frequency search (at least intermittently) and consume <P,overall, with-Sintersearch-Beacon>.

When using the Sintersearch-Beacon, we have an overall average power consumption of each UE, of P,overall,with-Sintersearch-Beacon=10%*<P,idle,with-inter-search>+90%*(2%*<P,idle,with-inter-search>+98%*<P,idle,no-inter-search>).

So, the overall increase of power consumption with introduction of Sintersearch-Beacon is: P,delta=P,overall,with-Sintersearch-Beacon−P,overall,no-S-intersearch-Beacon=90%*2%*(<P,idle,with-inter-search>−<P,idle,no-inter-search>).

That is less than 2% of the difference between power consumption when doing 'constantly' (still means only once per paging cycle!) inter-frequency search and the power consumption when inter-frequency search is not taking place.

In relative terms, the additional power that results from deploying the Sintersearch-Beacon is:

P,delta/P,overall,no-S-intersearch-Beacon=90%*2%*(<P,idle,with-inter-search>−<P,idle,no-inter-search>)/(10%*<P,idle,with-inter-search>+90%*<P,idle,no-inter-search>)
<90%*2%(<P,idle,with-inter-search>−<P,idle,no-inter-search>)/(100%*<P,idle,no-inter-search>)=90%*2%*(<P,idle,with-inter-search>/<P,idle,no-inter-search>−1)

In other words, the relative increase of UE power due to Sintersearch-Beacon is smaller than: 90%*2%*(<P,idle,with-inter-search>/<P,idle,no-inter-search>−1)

For example: <P,idle,with-inter-search>/<P,idle,no-inter-search>=5W/1W, such that the relative increase in power used by the UE/modem <7.2%.

Note: this is only the increase of the modem power, not the increase of total power consumed by a smartphone.

General formula for relative power increase with use of the Sintersearch Beacon:

The average relative increase in power consumption of UEs with use of Sintersearch-Beacon, compared to the operation without Sintersearch Beacon is: Delta-Power,relative<Alpha*Duty-Cycle-of-Sintersearch-Beacon*(P,idle,with-interfreq-search/P,idle,no-interfreq-search−1), where 'Alpha': the statistical/average share of those macrocell's UEs that don't do inter-frequency search at any moment (with no Sintersearch Beacon deployed), and 'Duty-Cycle-of-Sintersearch-Beacon'=Period_A/(Period_A+Period_B).

Figure 1:
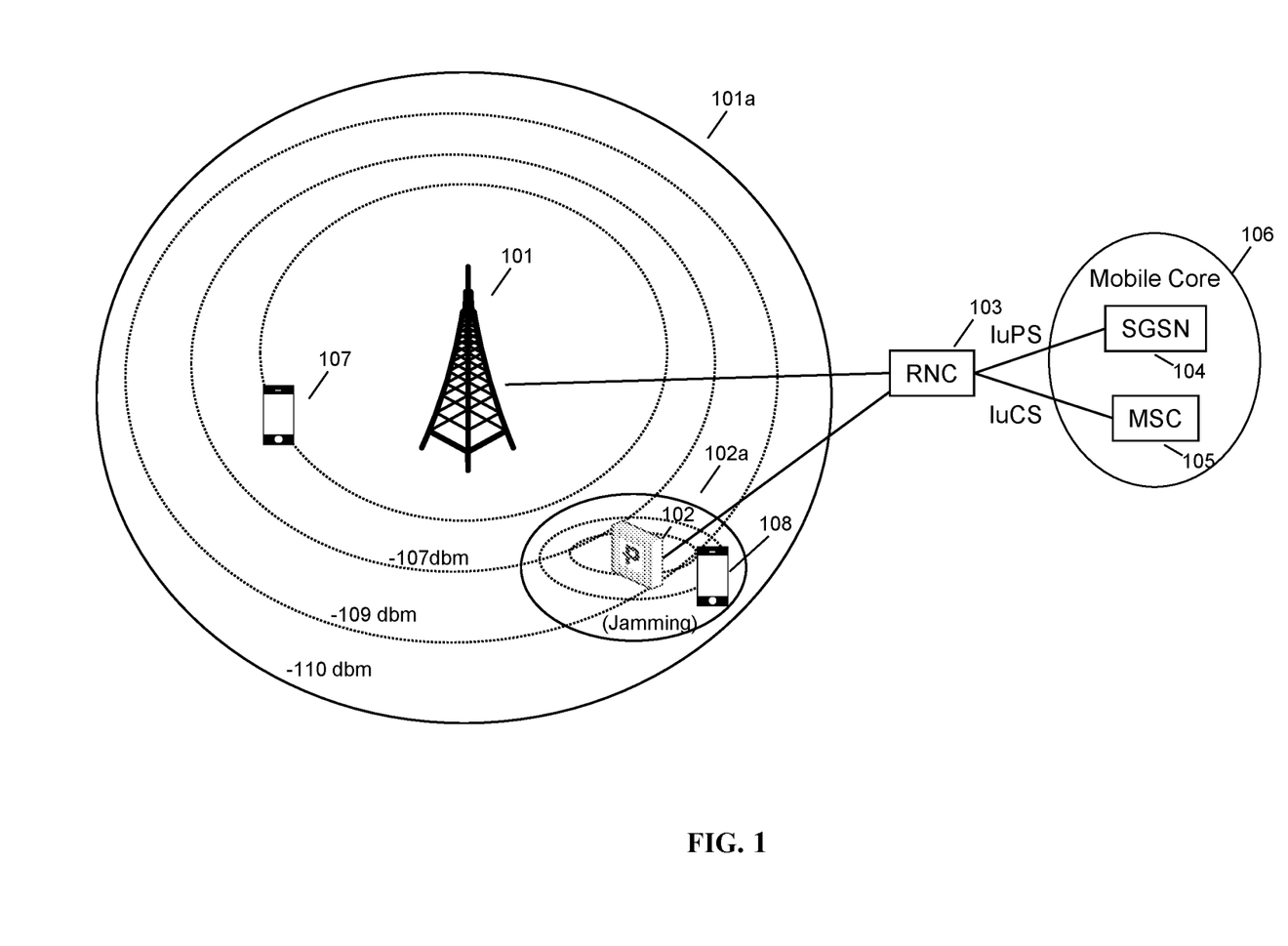
FIG. 1 is an architecture diagram of a wireless network, in accordance with some embodiments.

FIG. 1 is an architecture diagram of a wireless network, in accordance with some embodiments. Macro base station 101 is shown, along with small cell base station 102. The two cells are provisioned in an overlay/underlay configuration, such that macro cell 101 has coverage area 101a, which entirely overlaps with the coverage area 102a of small cell 102. The coverage areas are shown with lines of equal signal strength to indicate the relative strength of coverage at different points. As shown, macro base station 101 is connected to radio network controller (RNC) 103, which in turn is connected to serving gateway support node (SGSN) 104 and mobile switching center (MSC) 105, which together are part of a mobile core network 106. In some embodiments, small cell 102 is also connected to RNC 103. The cells are all 3G cells for purposes of explaining the present disclosure, but various multi-radio access technology (RAT) and virtualization schemes are contemplated with respect to both macro cell 101 and small cell 102, which may involve other RAT core networks (not shown). The present disclosure relates to sending out a cell reselection threshold from cell 101, or from cell 102, or from another cell in the network. User Equipments (UEs) 107 and 108 are shown. UE 107 is in a location that is well-covered by signal from macro cell 101. UE 108 is in a location that is poorly covered by macro cell 101 but well-covered by small cell 102.

In the case that small cell 102 is using the same frequency as macro cell 101 (intra-frequency reselection case), the small cell is effectively jamming the macro cell's signal within its coverage area 102a. This results in the small cell having better signal quality within its coverage area. However, in the interfrequency coverage area, where two different frequencies are being used, the macro cell 101 does not experience diminished signal quality and hence the UE 108 has no reason to reselect or hand over.

Figure 2:
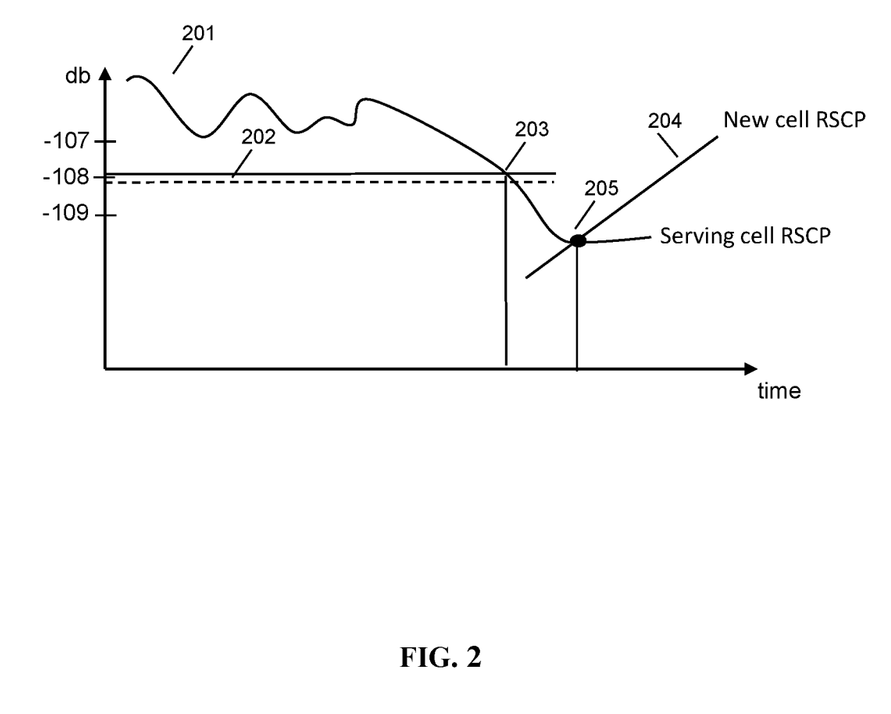
FIG. 2 is a timeline diagram of interfrequency search, in accordance with the prior art.

FIG. 2 is a simplified timeline diagram of interfrequency search, in accordance with the prior art. Signal strength is plotted against time. Macro cell 101 is shown with signal strength line 201, which may be a measurement of EcNo, RSCP, or any other signal strength measurement, and which may be shown in decibels. The line changes over time as a UE moves from a first location to a second location, for example, from the location of UE 107 to the location of UE 108. An Sintersearch threshold 202 is also shown, which is constant. At time 203, the UE is configured to begin searching and monitoring for interfrequency neighbors when the UE's serving cell's signal strength drops below this threshold; this is a precondition for reselection. Searching for neighbors reveals to the UE that a new cell is in the area, shown as line 204. At time 205, the UE observes that the new cell's signal is greater than the original cell, and the UE performs reselection to the new cell. The inventors have considered equivalents that include intra-frequency search, which involves a similar mechanism, as well as the use of offsets or hysteresis parameters.

Figure 3:
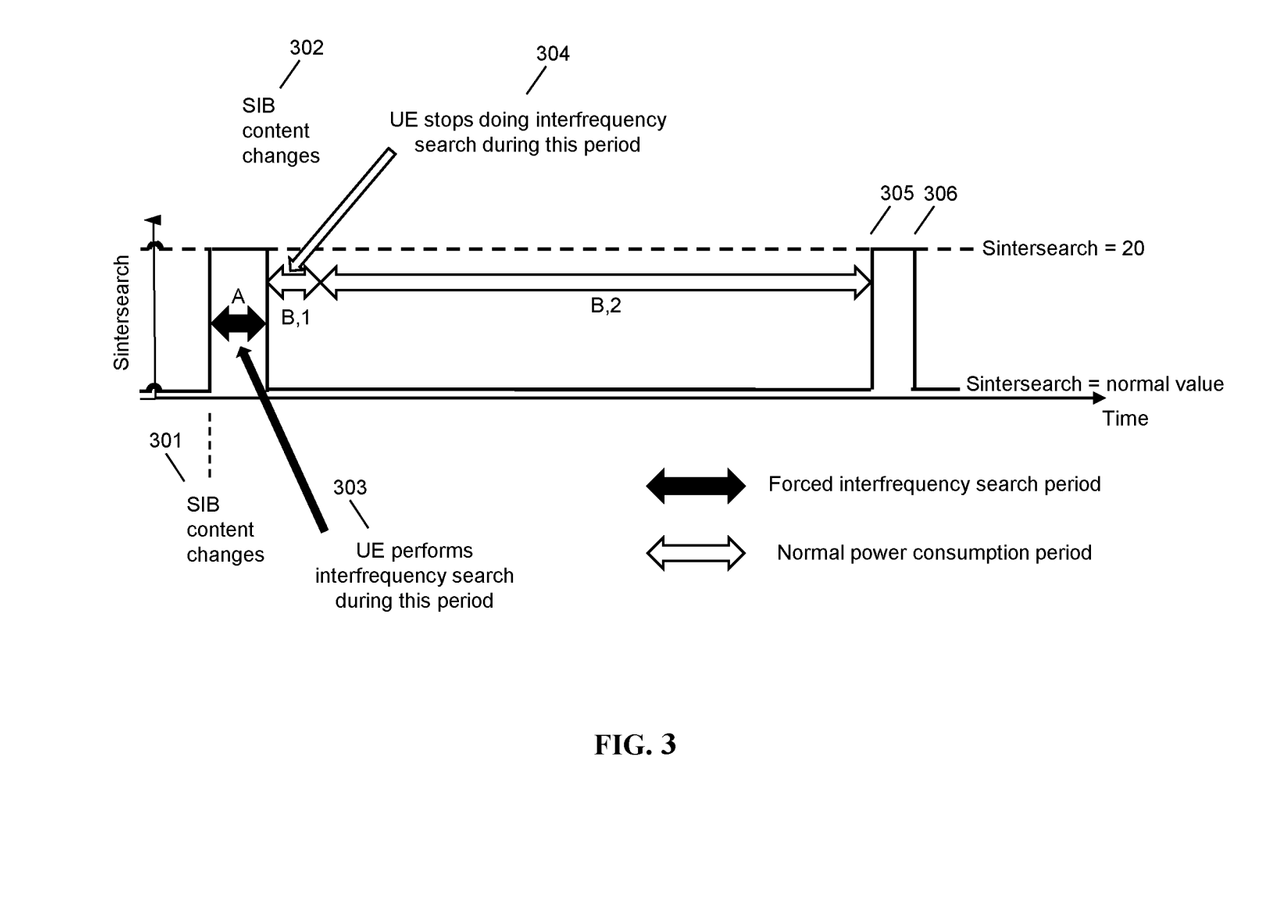
FIG. 3 is a timeline diagram of interfrequency search with an interfrequency search beacon, in accordance with some embodiments.

FIG. 3 is a timeline diagram of interfrequency search with an interfrequency search beacon, in accordance with some embodiments. A value of the Sintersearch threshold on the y-axis is plotted against time on the x-axis. Prior to time 301, a normal non-zero Sintersearch threshold is set at the nodeB. At time 301, the nodeB makes a change to the system information block (SIB), and the MIB indicates that a change has been made in SIB 3 content (through a modified cell value tag, for example). In the SIB, e.g., SIB3, the nodeB indicates that the threshold is increased to max or contains a new, high Sintersearch threshold value, e.g., 20. The UE is thereby forced to do interfrequency search.

In between time 301 and time 302, during period 303, the UE performs interfrequency search during this period and is in a higher power consumption state. Sometime during this period (set to about the max paging cycle of the serving macro cell), the UE may: look for paging, and also read the MIB; find that the MIB indicates a change on SIB 3; read SIB3; determine that it has to do inter-/intra-frequency search; and, at the next opportunity, may perform an inter-/intra-frequency search on specified UARFCN(s). This assumes it finds no interfrequency FAP.

At time 302, the nodeB makes a further change to the SIB to bring the threshold back to normal. The MIB indicates a change in SIB 3 content through a modified cell value tag, and SIB3 contains a Sintersearch threshold with a normal value. The UE is directed to perform interfrequency search during normal conditions. After time 302, during period 304, the UE stops interfrequency search and is in a normal power consumption period. E.g., during this period, the UE may, sometime during this period (corresponding to the max paging cycle of the cell): look for paging, and also read the MIB; find that the MIB indicates a change on SIB3; read SIB3; determine that it no longer needs to do an interfrequency search; and stop interfrequency search.

This can be repeated as a cycle, with the Sintersearch threshold increased at time 305 and returned to normal at time 306. In some embodiments, beaconing is contemplated for Sintrasearch according to the same method.

Figure 4:
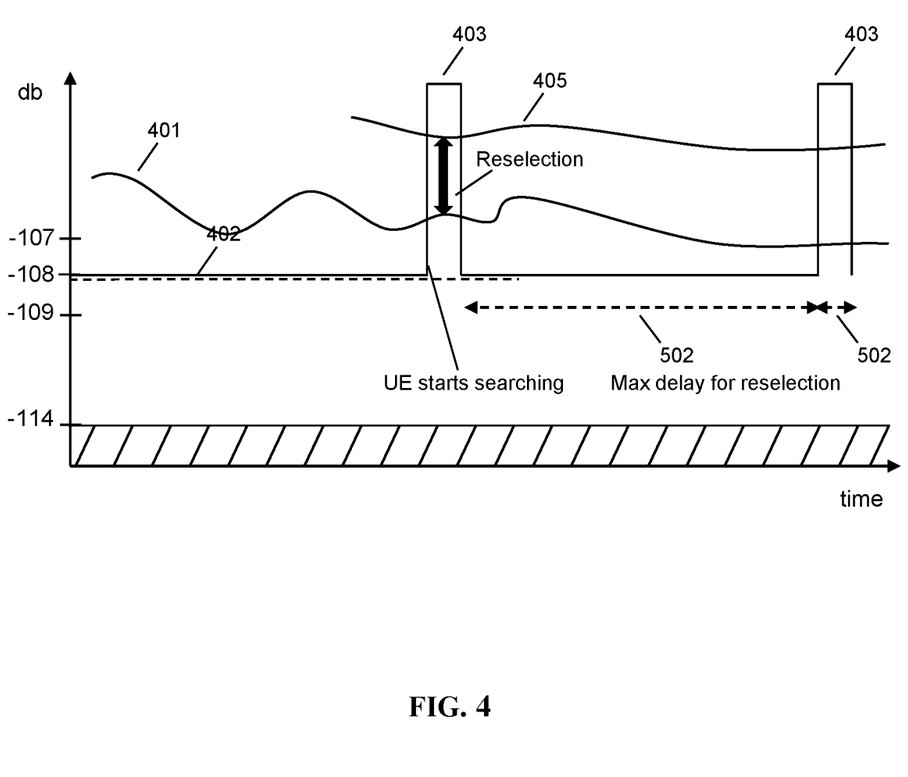
FIG. 4 is a second timeline diagram of interfrequency search with an interfrequency search beacon, in accordance with some embodiments.

FIG. 4 is a second timeline diagram of interfrequency search with an interfrequency search beacon, in accordance with some embodiments. Macro cell 101's signal strength is shown as signal strength measurement 401 (such as EcNo or RSCP). Small cell 102's signal strength is shown as signal strength measurement 405. Without beaconing, the UE will see that macro signal 401 is greater than Sintersearch threshold 402 at all times, and will never reselect to small cell 102. However, beginning at time 404 and continuing through time 403, beaconing is performed at the cell, causing the Sintersearch threshold to be elevated. At time 404, the UE receives the new Sintersearch threshold and begins searching and monitoring interfrequency cells, and this search may continue during period 403. This causes reselection of the UE to small cell 102, which has significantly improved signal. Reselection may in fact occur after the period 403 has expired, due to delays, offsets, hysteresis, or policy processing at the UE; however, after beaconing has been instituted for the first time, the UE is made aware of cell 102. The maximum delay for reselection is expected to be until the beginning of the next beaconing period, in some embodiments. Time periods 403 and 407 may be on the order of 5 seconds.

Another way to understand this process is that there are two time periods, a high-activity, high-power time period (periods 403 and 407) and a low-activity, low-power time period (406). The beacon period is high-activity because searching, measuring, and monitoring are high-power activities for the UE's radio. By contrast, the quiet period 406 requires very little power. By adjusting the balance between these two time periods, it is possible to effect some control over UE power usage.

In some embodiments, the presence or absence of more or less small cells in an underlay format can be used to determine the relative length of these periods. In some embodiments, a telecom operator may optimize the periods for a certain level of UE battery impact. In some embodiments, different duty cycles may be selected based on different levels of density of cell coverage.

Figure 5A:
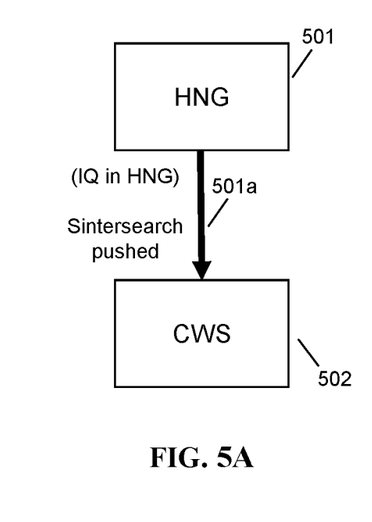
FIGS. 5A, 5B and 5C are schematic architecture diagrams showing signaling, in accordance with some embodiments.
Figure 5B:
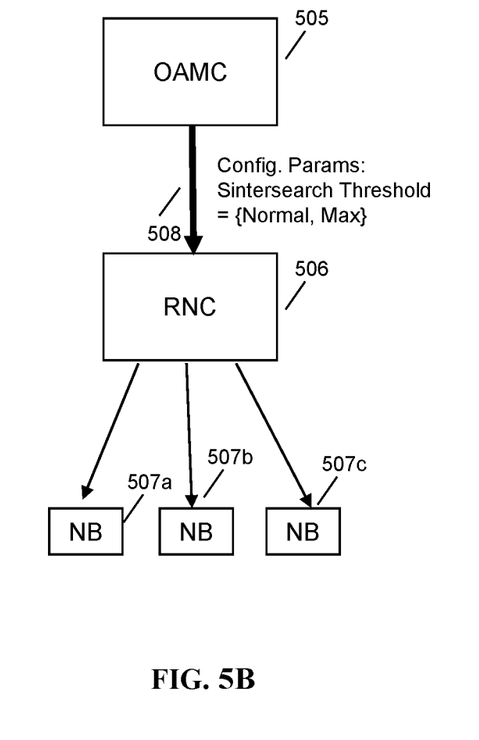
Figure 5C:
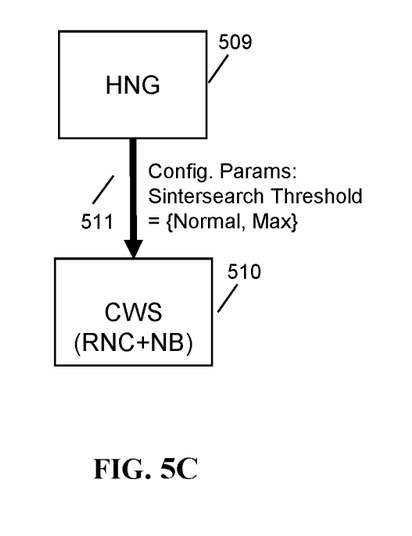

FIGS. 5A, 5B and 5C are schematic architecture diagrams showing signaling, in accordance with some embodiments. FIG. 5A shows communication between a coordinating server 501, here a Parallel Wireless HetNet Gateway™, in communication with a nodeB 502, here a Parallel Wireless Converged Wireless System™ multi-radio access technology (multi-RAT) base station. CWS 502 includes both a radio network controller and a nodeB functionality. According to FIG. 5A, HNG 501 makes determinations about when to increase the Sintersearch threshold and when to return it to its normal level, and accordingly, the CWS 502 receives and forwards any value for the threshold immediately upon receipt. Beaconing functionality is enabled or disabled at the HNG.

FIG. 5B shows communication in an embodiment built upon a standard-compliant infrastructure. Operations and management controller (OAMC) 503 is in communication with a radio network controller (RNC) 504, which in turn manages a plurality of nodeBs 505a, 505b, 505c. OAMC 503 sends configuration information, specifically, Sintersearch normal and max thresholds, and in some embodiments a duty cycle, to the RNC. The RNC 504 manages the beaconing functionality and sends it to the nodeBs 505a, 505b, 505c, which then set the thresholds according to the duty cycle, and send the cell reselection threshold to UEs in communication with the nodeBs.

FIG. 5C shows communication in a further embodiment. Coordinating server 506 is in communication with CWS 507, which is a combined RNC and nodeB. The HNG may send configuration information to the CWS, which may manage, activate, and deactivate the beaconing functionality using the configuration information, e.g., Sintersearch normal and max thresholds, and a duty cycle. The duty cycle may be a percentage of seconds, in some embodiments.

In some embodiments, different sets of configuration parameters may be contemplated. For example, in place of a duty cycle, a duration of an active period and a dormant period, or a single representative period, may be provided. As another example, the Sintersearch max threshold may be omitted, as the maximum value can be obtained by the nodeB without configuration. As another example, the Sintersearch normal threshold may be managed separately from the beaconing functionality. As another example, which applies when both of these apply, a single Boolean may be transferred to turn beaconing on and off, with all other parameters being preconfigured. As another example, solely a duty cycle may be used.

Figure 6:
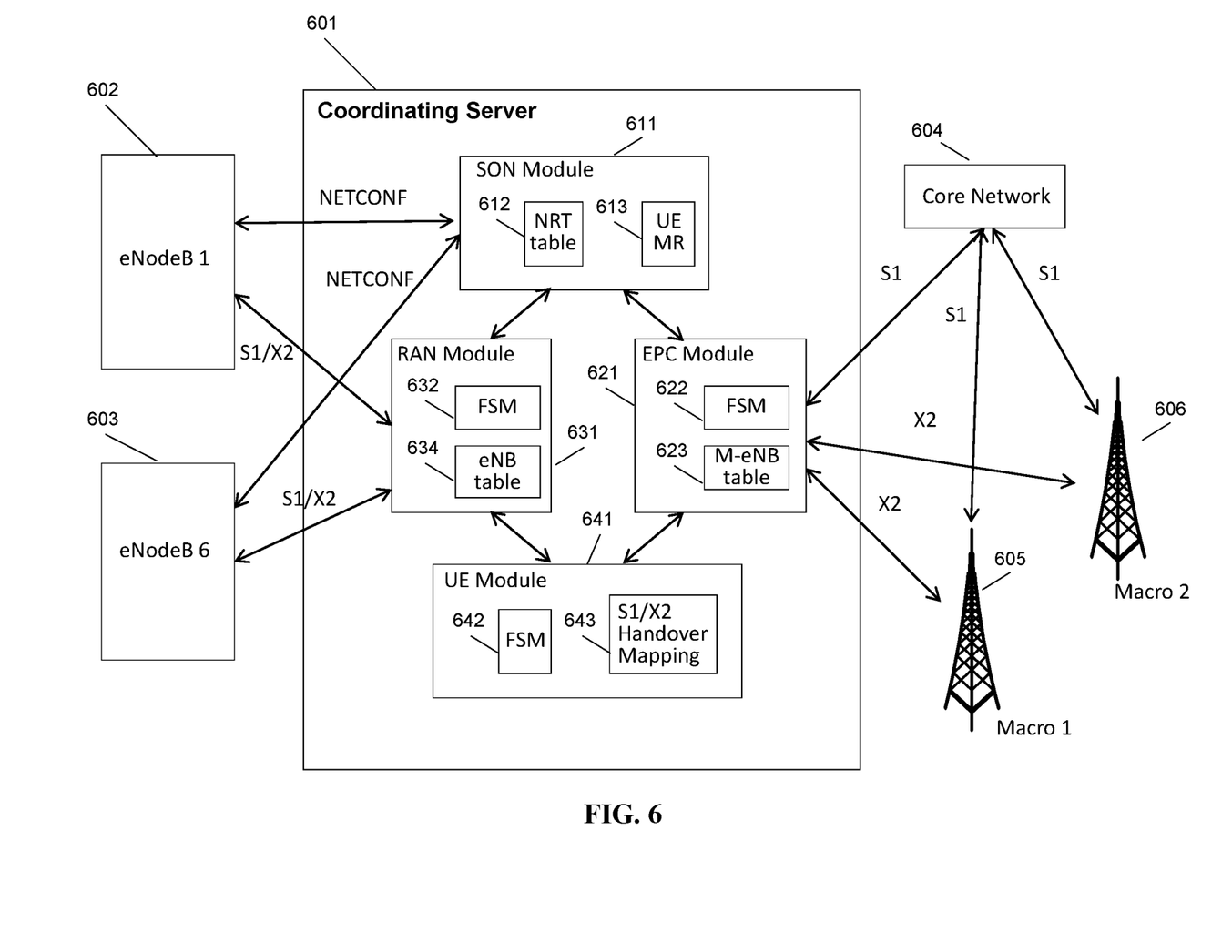
FIG. 6 is a schematic diagram of a coordinating server, in accordance with some embodiments.

FIG. 6 is a schematic diagram of a coordinating server, in accordance with some embodiments. Coordinating server 601 provides services to, and is coupled to, nodeB 1 602 and nodeB 6 603, on a RAN side of a network (i.e., inside of the gateway), such as two-way proxying and NAT that hides the RAN from the core network. Server 601 provides services to, and is coupled to, 3G/4G core network 604, macro nodeB 605, and macro nodeB 606, on a core network side of the network (outside of the gateway). As described, the coordinating server may provide services to 3G RAN/core nodes, or 4G RAN/core nodes, or both. The coordinating server may perform interworking between 3G and 4G.

Within server 601 are self-organizing network (SON) module 611, containing neighbor relation table (NRT) 612 and UE measurement report processing module 613; evolved packet core (EPC) module 621, containing core network finite state machine module 622 and macro eNodeB table 623; radio access network (RAN) module 631, containing finite state machine module 632 and nodeB table 634; and user equipment (UE) module 641, containing UE finite state machine module 642 and S1/X2 handover mapping table 643. In some embodiments, SON module 611 may perform NRT maintenance, load information processing and fractional frequency reuse (FFR) processing; RAN module 631 may perform X2 association management with eNodeBs 602, 603; EPC module 621 may perform X2 association management with macro eNodeBs 605, 606; and UE module may perform X2 handover and S1/X2 translation between nodeBs 602, 603 and macro nodeBs 605, 606. Finite state machine modules 622, 632, 642 may include one or more states for modeling the operational state of a connected EPC, UE, or RAN, respectively. More than one FSM may be present at each of modules 621, 631, 641, so that server 601 may be enabled to model the operational state of several network nodes at once. All the above managers/modules interact with each other to accomplish the assigned functionality. In some embodiments, RAN module 631 may control beaconing functionality, and may do so in coordination with NRT 612, such that beaconing may be enabled more often or for a greater duty cycle when a given nodeB is identified as having many neighbors, and in coordination with UE module 641, such that beaconing may be enabled more often or for a greater duty cycle when a given UE is known to be in a location with small cell underlay/macro cell overlay, for example.

In some embodiments, server 601 may include one or more processors, each with one or more processor cores. Each of modules 611, 621, 631, and 641 are coupled to each other within server 601, and may execute on one or more shared processors (not shown) coupled with memory (not shown). Server 601 may include a real-time operating system, such as a Linux operating system, and may include an operating system that distributes tasks among multiple cores. Server 601 may provide one or more of modules 611, 621, 631, 641 as processes, threads, user-mode or kernel-mode processes, processes in hardware or in software, in some embodiments. In some embodiments, each of modules 611, 621, 631, 641 may execute on the same server 601; in other embodiments, these modules may execute on remote machines connected via a network. In some embodiments, a remote failover server (not shown) may be made available for handling failures at server 601. The failover mechanism may involve checkpointing operations at server 601 in each of the modules therein. Certain operations may be hardware accelerated, such as network processing tasks, IPsec tasks, deep packet inspection tasks, or other tasks.

Server 601 may include one or more network interfaces; these network interfaces may include Ethernet (10/100/1000/10000 Mbit) interfaces, Wi-Fi (802.11a/b/g/n/ac/af/ad) interfaces, 3G or 4G interfaces, virtual interfaces, or other interfaces. In some embodiments, one network interface may be directed towards the core network and located at, or coupled to, EPC module 621; this interface would communicate using the S1 protocol to MME 604 and using the X2 protocol to macro cells 605, 606. In some embodiments, another network interface may be directed towards one or more RANs internal to the gateway and connected to RAN module 631, for communicating to RANs 602, using either S1 or X2 as appropriate. Translation or interworking of protocols may occur at one or more of modules 611, 621, 631, or 641 as appropriate. In some embodiments, SON module 611 may also be coupled to an interface for communicating with RANs 602, 603; this interface may be labeled the SON interface, and the NETCONF protocol (XML over HTTPS) may be used to communicate in a proprietary or non-proprietary manner with RANs 602, 603 regarding network configuration, orchestration, and coordination operations.

Figure 7:
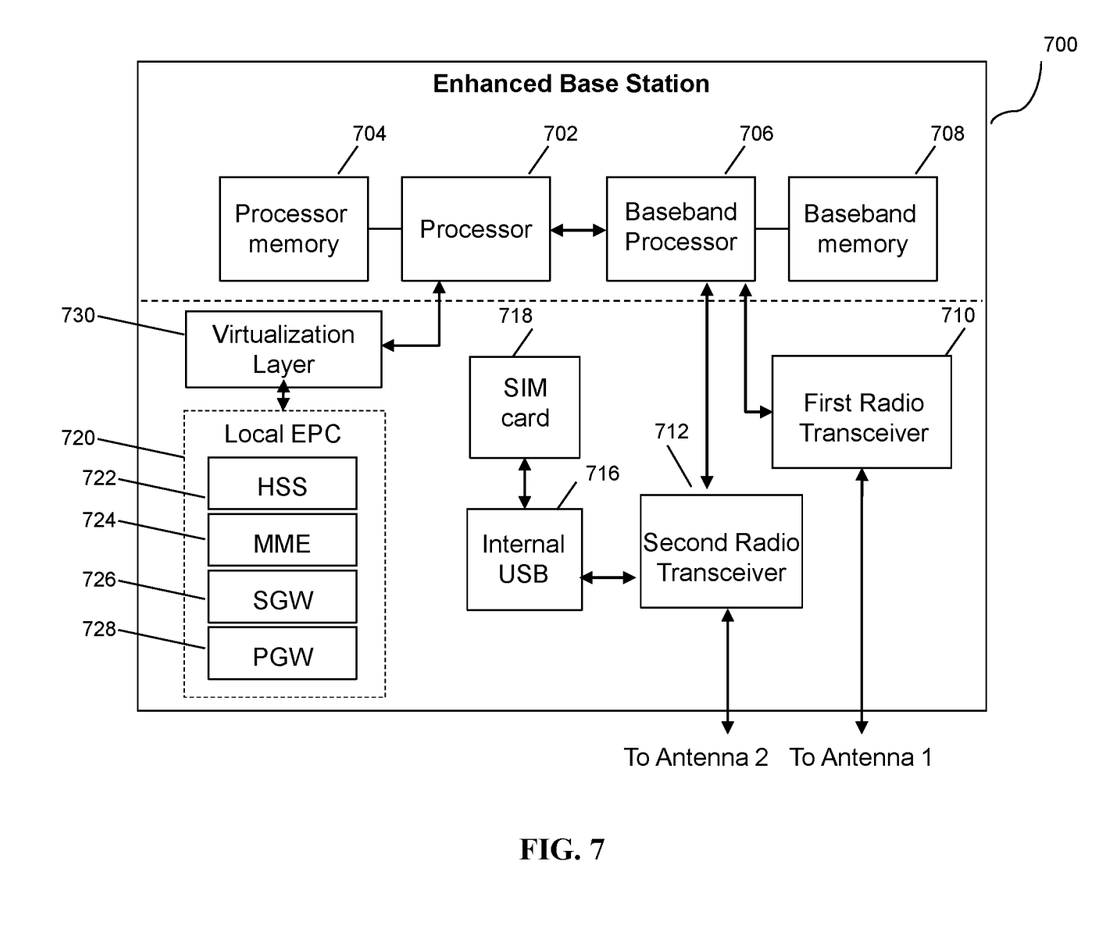
FIG. 7 is a schematic diagram of an enhanced base station, in accordance with some embodiments.

FIG. 7 is a schematic diagram of an enhanced base station, in accordance with some embodiments. Base station 700 may include processor 702, processor memory 704 in communication with the processor, baseband processor 706, and baseband processor memory 708 in communication with the baseband processor. Base station 700 may also include first radio transceiver 710 and second radio transceiver 712, internal universal serial bus (USB) port 716, and subscriber information module card (SIM card) 718 coupled to USB port 714. In some embodiments, the second radio transceiver 712 itself may be coupled to USB port 716, and communications from the baseband processor may be passed through USB port 716. The enhanced base station may be a mesh network base station, in communication with other mesh nodes via Wi-Fi.

A virtualization layer 730 may also be included for mediating communications with an evolved packet core EPC, specifically including the core network EPC (not shown) and local evolved packet core (EPC) module 720. Local EPC 720 may be used for authenticating users and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Virtualization layer 730 and local EPC 720 may each run on processor 702 or on another processor, or may be located within another device.

Processor 702 and baseband processor 706 are in communication with one another. Processor 702 may perform routing functions, and may determine if/when a switch in network configuration is needed. Baseband processor 706 may generate and receive radio signals for both radio transceivers 710 and 712, based on instructions from processor 702. In some embodiments, processors 702 and 706 may be on the same physical logic board. In other embodiments, they may be on separate logic boards.

The first radio transceiver 710 may be a radio transceiver capable of providing LTE eNodeB functionality, or 5G gNodeB functionality, and may be capable of higher power and multi-channel OFDMA. The second radio transceiver 712 may be a radio transceiver capable of providing LTE UE functionality. Both transceivers 710 and 712 are capable of receiving and transmitting on one or more LTE bands. In some embodiments, either or both of transceivers 710 and 712 may be capable of providing both LTE eNodeB and LTE UE functionality. Transceiver 710 may be coupled to processor 702 via a Peripheral Component Interconnect-Express (PCI-E) bus, and/or via a daughtercard. As transceiver 712 is for providing LTE UE functionality, in effect emulating a user equipment, it may be connected via the same or different PCI-E bus, or by a USB bus, and may also be coupled to SIM card 718.

SIM card 718 may provide information required for authenticating the simulated UE to the evolved packet core (EPC). When no access to an operator EPC is available, local EPC 720 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 700 is not an ordinary UE but instead is a special UE for providing backhaul to device 700.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 710 and 712, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 702 for reconfiguration.

Other elements and/or modules may also be included, such as a nodeB, home eNodeB, a local gateway (LGW), a self-organizing network (SON) module, or another module. Additional radio amplifiers, radio transceivers and/or wired network connections may also be included.

Processor 702 may identify the appropriate network configuration, and may perform routing of packets from one network interface to another accordingly. Processor 702 may use memory 704, in particular to store a routing table to be used for routing packets. Baseband processor 706 may perform operations to generate the radio frequency signals for transmission or retransmission by both transceivers 710 and 712. Baseband processor 706 may also perform operations to decode signals received by transceivers 710 and 712. Baseband processor 706 may use memory 708 to perform these tasks.

Additional embodiments of the present application are contemplated.

In the present disclosure, the words "cell," "eNB," "eNodeB," and "gNodeB" are used to refer to a cellular base station. However, one of skill in the art would appreciate that it would be possible to provide the same functionality and services to other types of base stations, specifically to home eNodeBs (HeNodeBs), as well as any equivalents.

While the present disclosure uses the terms "small cell" and "macro cell," this term is used merely to illustrate the concepts herein, and nothing is implied regarding size, power level etc. for any cells that could be used with the disclosed systems and methods, i.e. "small cell" may be interpreted as including macro cells, femto cells, multi-radio access technology (RAT) access nodes, indoor cells, outdoor cells, etc. The word "X2" herein may be understood to include X2 or also Xn, as appropriate.

Various alternative embodiments are also contemplated by the inventors. For example, certain functions may be performed at an eNodeB, or at a multi-radio access technology node (multi-RAT) node, instead of at a virtualization server. The virtualization server may be known as an LTE access controller. The functions of the virtualization server may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer mesh nodes, for more or fewer data streams, and other alternatives. In some embodiments, these optimizations may be performed at the eNodeB, at the virtualization server, within a function performing radio resource allocation and coding selection, or at another location. In some embodiments, a virtualization server may identify and initiate power adjustments to improve channel quality.

In some embodiments, the mesh network nodes may provide complete or partial guesses at what paths are the optimal or best paths during a particular time interval, and may be enabled to send messages back to the virtualization server to communicate these complete or partial guesses.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method, comprising:
sending an instruction from a radio network to a user equipment (UE) in an idle mode to adjust an existing cell reselection parameter at a UE to a high value, wherein the radio network is one or more of a Global System for Mobile Communications (GSM), Enhanced Data Rates for GSM Evolution (EDGE), Universal Mobile Telecommunications System (UMTS), CDMA2000, Long Term Evolution (LTE), Long Term Evolution Advanced (LTE-Advanced), or 5G gNodeB radio network;
subsequently instructing the UE to return the cell reselection parameter to its previous value, after a first predetermined interval; and
subsequently sending a second instruction to the UE in an idle mode to adjust the cell reselection parameter at the UE to the high value, after a second predetermined periodic interval,
causing the UE to reselect to a cell with superior signal even when the UE is under good coverage attached to an existing macro cell, further comprising repeatedly raising the cell reselection parameter to a high value, in order to cause the UE to perform a neighboring cell search from idle mode and identity another cell to which to attach, thereby offloading the macro cell.

2. The method of claim 1, wherein the cell reselection parameter is an Sintersearch threshold.

3. The method of claim 1, wherein the cell reselection parameter is an Sintrasearch threshold.

4. The method of claim 1, wherein the high value is a maximum permitted value.

5. The method of claim 1, wherein the first predetermined interval and the second predetermined periodic interval are configured to cause the UE to perform a periodic neighboring cell search while having a 5% impact on projected UE battery life.

6. The method of claim 1, wherein the first predetermined interval is 5 seconds and the second predetermined periodic interval is every 5 minutes.

7. The method of claim 1, wherein the previous value is a cell reselection parameter value configured based on an assumption that significantly overlapping cell coverage is rare.

8. The method of claim 1, wherein the cell with superior signal is a small cell configured to cover a small area that is a subset of the coverage area of the existing macro cell.

9. The method of claim 1, wherein the radio network is a nodeB or eNodeB, and wherein the radio network is configured with the first predetermined interval and the second predetermined periodic interval by a coordinator node in an operator core network.

10. The method of claim 1, wherein the cell reselection parameter is a SsearchRAT threshold.

11. The method of claim 1, wherein the cell reselection parameter is an SrxlevServing parameter in a Long Term Evolution (LTE) radio access technology.

12. The method of claim 1 wherein a message is received from a core network using a first radio access technology and sent to a base station using a second radio access technology.

* * * * *